United States Patent
Jänker

(10) Patent No.: US 8,376,862 B2
(45) Date of Patent: Feb. 19, 2013

(54) MOTORIZED SPINDLE DRIVE WITH OVERLOAD PROTECTION

(75) Inventor: Peter Jänker, Riemerling (DE)

(73) Assignee: EADS Deutschland GmbH (DE)

( * ) Notice: Subject to any disclaimer, the term of this patent is extended or adjusted under 35 U.S.C. 154(b) by 69 days.

(21) Appl. No.: 12/679,973

(22) PCT Filed: Sep. 12, 2008

(86) PCT No.: PCT/DE2008/001537
§ 371 (c)(1),
(2), (4) Date: Mar. 25, 2010

(87) PCT Pub. No.: WO2009/039831
PCT Pub. Date: Apr. 2, 2009

(65) Prior Publication Data
US 2010/0203974 A1    Aug. 12, 2010

(30) Foreign Application Priority Data

Sep. 27, 2007   (DE) .................. 10 2007 046 583

(51) Int. Cl.
*F16D 7/02* (2006.01)
(52) U.S. Cl. ........................................... 464/30; 74/84 R
(58) Field of Classification Search .................. 464/30, 464/40, 41; 74/20, 84 R
See application file for complete search history.

(56) References Cited

U.S. PATENT DOCUMENTS

| | | | |
|---|---|---|---|
| 3,714,479 A | 1/1973 | Moore et al. | |
| 4,588,913 A * | 5/1986 | Adami | 464/30 |
| 4,947,070 A | 8/1990 | Hill et al. | |
| 2002/0144876 A1 * | 10/2002 | Harvey | |
| 2003/0029688 A1 * | 2/2003 | Lovatt | |
| 2004/0007923 A1 | 1/2004 | Tesar | |
| 2006/0113933 A1 | 6/2006 | Blanding et al. | |
| 2007/0145806 A1 | 6/2007 | Wilder et al. | |

FOREIGN PATENT DOCUMENTS

| | | |
|---|---|---|
| CA | 2529629 A1 | 6/2007 |
| DE | 10335694 A1 | 3/2005 |
| EP | 1793477 A1 | 6/2007 |
| GB | 2365830 A | 2/2002 |
| SU | 1295104 A1 | 3/1987 |
| SU | 1441119 A1 | 11/1988 |
| WO | WO 2005079134 * | 9/2005 |

OTHER PUBLICATIONS

International Search Report, PCT/DE2008/001537, dated Feb. 18, 2009.

* cited by examiner

*Primary Examiner* — Greg Binda
*Assistant Examiner* — Josh Skroupa
(74) *Attorney, Agent, or Firm* — Lerner, David, Littenberg, Krumholz & Mentlik, LLP

(57) ABSTRACT

A motorized spindle drive for an actuator, particularly for an aerodynamically effective surface of an aircraft, may have a spindle and a motor that comprises a mechanical transmission element engaging the spindle in order to drive said spindle and causing a relative movement in the axial direction between the spindle and the motor and that is connected to an element that is fixed in place relative to the motion of the spindle, said element absorbing the torque of the motor. According to the invention, the bearing absorbing the torque of the motor comprises a detachable coupling that detaches upon a predetermined torque being exceeded and releases the motor in the sense of a free movement in the axial direction of the spindle relative to the fixed element.

10 Claims, 2 Drawing Sheets

MOTORIZED SPINDLE DRIVE WITH OVERLOAD PROTECTION

CROSS REFERENCE TO RELATED APPLICATIONS

Figure 1:
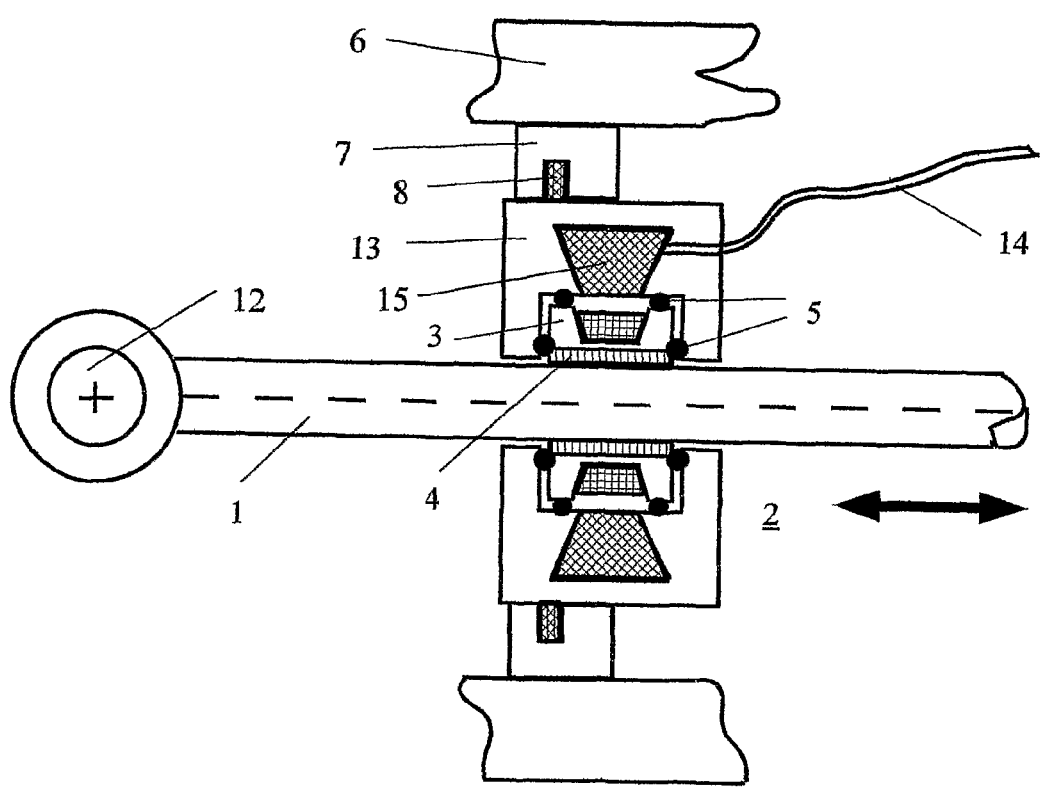

The present application is a national phase entry under 35U.S.C. §371 of International Application No. PCT/DE2008/001537, filed Sep. 12, 2008, published in German, which claims the benefit of German Patent Application No. 10 2007 046 583.3, filed Sep. 27, 2007. The disclosures of said applications are incorporated by reference herein.

The invention relates to a motorized spindle drive for an actuator, particularly for an aerodynamically effective surface of an aircraft, according to the precharacterising part of claim 1.

For reasons of operational safety, actuators that are provided for positioning systems of aircraft, for example actuators for control surfaces, trim surfaces and high-lift surfaces, are designed to be redundant, which is significant particularly in the case of actuators that are used for primary flight control. A redundant mechanical parallel arrangement of actuators requires that in the case of a malfunction the one, defective, drive must not impede the second drive, and particularly must not jam, so that the actuation work can be performed by the intact, second drive. According to the present-day state of the art, hydraulic actuators in particular are used for this purpose.

For use in a so-called all-electric aircraft, in which said positioning systems are operated by electric motors, according to present-day state of the art only expensive systems, for example electro-hydrostatic drives, are suitable for implementing such non-jamming redundant drives. Conventional electric-motor driven spindle drives of simple design are not suitable for this purpose because jamming of the drive unit cannot safely be excluded. For example, in the case of mechanical fracture of components, for example of a ball in a ball screw mechanism of the spindle drive, the spindle nut and the spindle thread can jam against each other and can block the drive, which results in corresponding disadvantageous and possibly disastrous consequences.

It is the object of the invention to create a simply designed motorized spindle drive that ensures operation without jamming. Such a motorized spindle drive is to be suitable, particularly, for a redundant arrangement.

The object is met by a motorized spindle drive with the features of claim 1.

The invention creates a motorized spindle drive for an actuator, particularly for an aerodynamically effective surface of an aircraft, having a spindle and a motor that comprises a mechanical transmission element engaging the spindle in order to drive said spindle and causing a relative movement in the axial direction between the spindle and the motor and that is supported at an element that is fixed in place relative to the motion of the spindle. According to the invention, the bearing absorbing the torque of the motor comprises a detachable coupling that detaches upon a predetermined torque being exceeded and releases the motor in the sense of a free movement in the axial direction of the spindle relative to the fixed element.

Advantageous embodiments and improvements of the motorized spindle drive according to the invention are indicated in the dependent claims.

According to an embodiment of the invention, the detachable coupling comprises two elements that are moveable relative to each other, which in a first position are locked against each other so as to be mutually engaging in a positive-locking manner in order to transmit the torque of the motor and to cause the relative movement of the spindle, and which in a second position are unlocked from each other in the sense of a free movement of the motor in the axial direction of the spindle, and furthermore comprises means that respond to the torque transmitted by the motor, which means, when the predetermined torque has been exceeded, cause the elements that are moveable relative to each other to move from the first position to the second position.

According to an embodiment of the invention, the two elements that are moveable relative to each other comprise a retaining element with a cutout in which the motor is rotatable on the spindle axis at least over a predetermined angular range, and comprise at least one detent element that is provided on the motor and that in a respectively corresponding recess in the retaining element is movable in circumferential direction and is guided by way of a first part of the predetermined angular range in the sense of mutual locking relative to the axial direction, wherein the recess in the retaining element comprises a disengaging position that is formed by a notch, in which disengaging position the detent element is releasable in axial direction.

According to an embodiment of the invention, the means which when the predetermined torque has been exceeded release the movement of the elements that are moveable relative to each other from the first position to the second position are formed by a friction clutch that is effective between the elements that are moveable relative to each other.

According to another embodiment of the invention, the means which when the predetermined torque has been exceeded release the movement of the elements that are moveable relative to each other from the first position to the second position are formed by an elastic spring element that is effective between the elements that are moveable relative to each other.

The motor is preferably an electric motor.

According to an embodiment of the invention, the transmission element that engages the spindle is a spindle nut that is arranged centrically in a rotor of the motor.

According to an embodiment of the invention, the motor is arranged so as to encompass the spindle concentrically to the axis of said spindle.

A detachable coupling can be provided that comprises a single detent element that is guided in a recess.

On the other hand a detachable coupling can be provided that comprises two or more detent elements, each being guided in a recess, which detent elements are mutually offset by identical angles or different angles around the circumference.

Below, an exemplary embodiment of the motorized spindle drive according to the invention is explained with reference to the drawing.

Figure 2A:
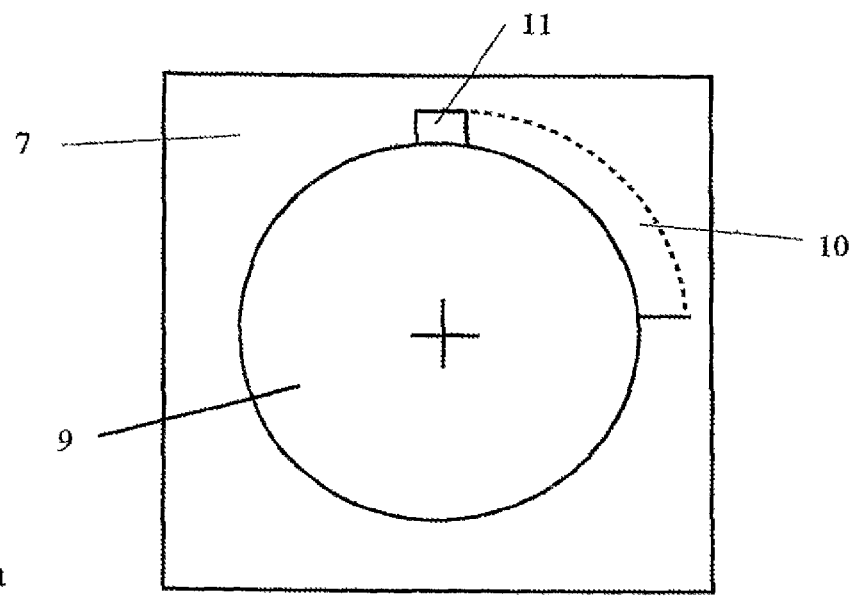
Figure 2B:
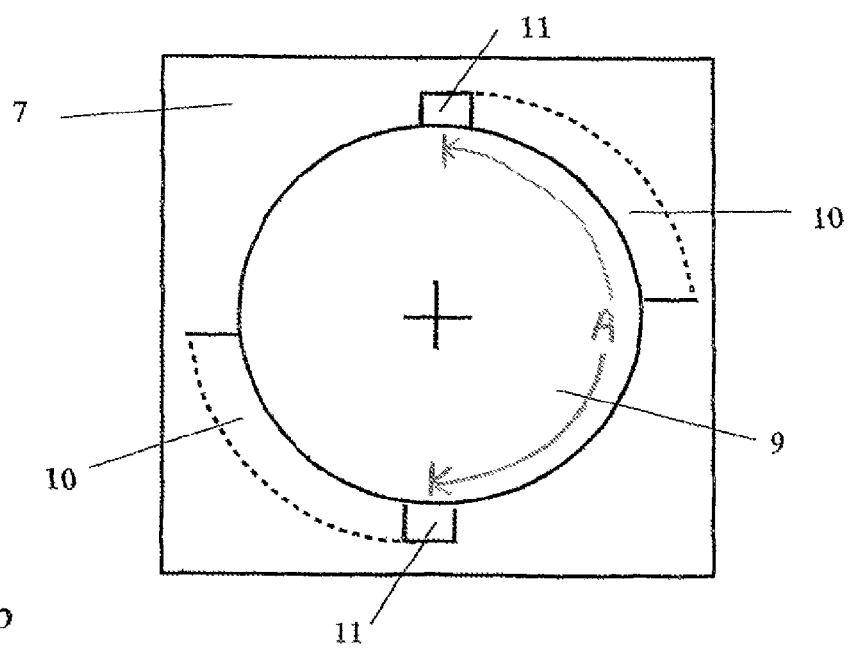

The following are shown:

FIG. 1 a diagrammatic partial section view of a motorized spindle drive for an actuator, particularly for an aerodynamically effective surface of an aircraft, according to an embodiment of the invention;

FIG. 2a) a view, in the direction of the spindle shown in FIG. 1, of a retaining element provided in the motorized spindle drive, according to an embodiment; and FIG. 2b) a view, in the direction of the spindle shown in FIG. 1, of a retaining element provided in the motorized spindle drive, according to another embodiment.

FIG. 1 shows part of a motorized spindle drive for an actuator that is provided to drive an aerodynamically effective surface of an aircraft, for example a control surface or a high-lift surface of an aircraft.

This motorized spindle drive comprises a spindle 1 which on one end, in FIG. 1 on the left-hand end, comprises an attachment eyelet 12 on which a connection to the aerodynamically effective surface (not shown in the figure) which is to be moved, of the aircraft, is established either directly or by way of interconnected components (not shown). On the other hand, the spindle drive is supported on a component or element 6 that in relation to the movement of the spindle 1 is to be considered as fixed in the axial direction of the spindle 1. This component 6 can, for example, be a housing of the motorized spindle drive, which in turn can be connected in any suitable manner, either fixed or movable, to the structure of the aircraft.

The motorised spindle drive comprises a motor 2 which includes a mechanical transmission element 4 that engages the spindle 1 to drive it, which transmission element 4 causes a relative movement between the spindle 1 and the motor 2 in axial direction, i.e. in the direction of the spindle axis. The motor 2 is supported on an element that is fixed relative to the spindle movement, namely on the previously-mentioned component or element 6, which is, for example, designed in the form of a housing component or structural component of an aircraft. The motor 2 comprises a stator 13 with a stator winding 15 that is supplied with drive current by way of a line 14, and a rotor 3 which is rotatably supported relative to the stator 13 in order to rotatably drive the spindle 1. The rotor 3 and the spindle nut 4 are supported by bearings 5 relative to the stator 13 or the housing of the motor 2.

The bearing 6, 7, 8, 9, which absorbs the torque of the motor 2, comprises a detachable coupling 7, 8, 9 that detaches upon a predetermined torque being exceeded, and releases the motor 2 in the sense of a free movement in the axial direction of the spindle 1 relative to the above-mentioned fixed element 6. Said detachable coupling 7, 8, 9 comprises two elements 7, 8 that are movable relative to each other, which in a first position are mutually engaged in a positive-locking manner and are locked relative to each other so that they transmit the torque of the motor 2 and cause the relative movement of the spindle 1 relative to the fixed element 6, and which in a second position are unlocked from each other so that a release of the movement of the motor 2 in axial direction of the spindle 1 takes place.

In the exemplary embodiments shown in FIGS. 1, 2*a*) and 2*b*) these two elements 7, 8 that are moveable relative to each other are formed on the one hand by a retaining element 7 with a cutout 9 in which the motor 2 is rotatable on the spindle axis over a predefined angular range, as well as, on the other hand, by at least one detent element 8 that is provided on the motor 2 and that is connected, so as to be fixed, to said motor 2, and in a respectively corresponding recess 10 in the retaining element 7 is movable in circumferential direction. To this effect the recess 10 is designed in the manner of a groove in the shape of a sector of an annulus, in which groove the detent element 8 can perform over said angular range a circular path on the spindle axis. Over a first part of the provided angular range the detent element 8 is guided in the sense of mutual locking relative to the axial direction. Furthermore, the recess 10 in the retaining element 7 comprises an notch 11 that forms a disengaging position in which the detent element 8 is released in axial direction. This means that during rotation of the detent element 8 along the recess 10 from a locked position to the disengaging position 11 it and thus the motor 2 are released so that the motor 2 is released from the element 6 that is fixed relative to the spindle 1.

In the exemplary embodiment shown in FIG. 2*a*) a coupling is provided that comprises a sole detent element 8 that is guided in a recess 10, wherein the motor 2 is rotatable around the spindle axis over a predetermined angular range.

In another exemplary embodiment, shown in FIG. 2*b*), a coupling is provided that comprises two detent elements 8, each guided in a recess 10, which detent elements 8 are offset, relative to each other, over the circumference by a predetermined angle A, in FIG. 2*b*) by 180°, wherein the motor in turn is rotatable around the spindle axis over a predetermined angular range.

When the coupling comprises two or several detent elements 8, each guided in a recess 10, which elements cause improved distribution of the forces that occur on the coupling that is formed by the detent elements 8 that are guided in a recess 10, said detent elements 8 can be circumferentially offset by identical or different angles A, for example three elements offset by 120° or by three different angles A, which overall result in 360°.

Release of the movement of the elements 7, 8 that are moveable relative to each other, in other words of the retaining element 7 and of the detent element or elements 8 from the first position to the second position, takes place by suitable means if the predetermined torque has been exceeded. In the exemplary embodiments shown in FIGS. 1, 2*a*) and 2*b*) to this effect a friction clutch is provided which is effective between the elements 7, 8 that are moveable relative to each other, in other words between the retaining element 7 and the detent element 8. This friction clutch can be implemented in a comparatively simple manner between the surface of the detent element 8 and the surface of the recess 10 formed in the retaining element 7, wherein optionally, in order to influence mutual friction, coatings of the surface, linings or similar can be provided on one or on both of said elements, as is common with friction clutches.

As an alternative, such a means, which when the predetermined torque is exceeded releases movement of the elements 7, 8 that are moveable relative to each other, can also be formed by an elastic spring element that is effective between the motor 2 and the retaining element 7 or the fixed element 6. Such a spring element would then, however, have to be detachable at least on one side in order to ensure complete release of the motor in axial direction of the spindle 1.

To ensure the provision of a redundant actuator, preferably two or more such spindle drives are to be provided, at least one of which comprises a detachable coupling 7, 8, 9 of the type described, or of a similar type, but preferably both types, which coupling 7, 8, 9 detaches upon a predetermined torque being exceeded. In this arrangement the motor or motors 2 of the spindle drives are designed such that their maximum drive torque clearly, for example by a factor of 2 or more, exceeds the maximum nominal operating torque of the elements that are to be operated by the spindle drive, in other words, for example, of the aerodynamically effective surfaces of an aircraft. In the case of the jamming of motor 2 of a drive, the motor of the other drive needs to generate the predetermined triggering moment only during the short triggering period of the coupling 7, 8, 9 so that the two elements 7, 8 that are moveable relative to each other are unlocked from each other and the motor 2 is released.

In the case of jamming, a moment is generated as a result of suitable control of the motor 2, which moment exceeds the detaching value of the detachable coupling 7, 8, 9, as a result of which the stator 13 of the motor 2 is moved in circumferential direction over the above-mentioned angular range, and the motor 2 is then released in the axial direction of the spindle 1.

In the exemplary embodiment shown, the motor 2 or motors 2 are electric motors that comprise a stator 13 and a rotor 3, wherein the transmission element 4 that engages the spindle 1 is formed by a spindle nut that is engaged centrically in the rotor 3. The motor 2 is thus arranged so that its rotor 3 encompasses the spindle 1 concentrically to its axis. The feed lines 14 that supply the windings of the stator 13 are of course to be provided such that when the motor 2 is released in axial direction of the spindle 1 said feed lines 14 can follow without damage.

The invention thus creates an electric-motor-driven spindle drive of a simple design that ensures operation without jamming.

| List of reference characters | |
|---|---|
| 1 | Spindle |
| 2 | Motor |
| 3 | Rotor |
| 4 | Spindle nut |
| 5 | Bearing |
| 6 | Fixed part |
| 7 | Retaining element |
| 8 | Detent element |
| 9 | Notch |
| 10 | Recess |
| 11 | Disengaging position |
| 12 | Attachment eyelet |
| 13 | Stator |
| 14 | Stator lines |

The invention claimed is:

1. A motorized spindle drive for an actuator, particularly for an aerodynamically effective surface of an aircraft, the motorized spindle drive comprising:
   a spindle; and
   a motor that is supported on an element which is fixed in place relative to the motion of the spindle, the motor comprising:
      a mechanical transmission element which engages the spindle for driving the spindle and causes a relative movement in the axial direction between the spindle and the motor; and
      a bearing absorbing the torque of the motor, wherein the bearing comprises a detachable coupling that detaches upon a predetermined torque being exceeded and releases the motor in the sense of a free movement in the axial direction of the spindle relative to the fixed element.

2. The motorized spindle drive according to claim 1, characterized in that:
   the detachable coupling comprises two elements that are moveable relative to each other, which in a first position are locked against each other so as to be mutually engaging in a positive-locking manner in order to transmit the torque of the motor and to cause the relative movement of the spindle, and which in a second position are unlocked from each other in the sense of a free movement of the motor in the axial direction of the spindle, wherein means are provided that respond to the torque transmitted by the motor, which means, when the predetermined torque has been exceeded, release the elements that are moveable relative to each other to move from the first position to the second position.

3. The motorized spindle drive according to claim 2, characterized in that the two elements that are moveable relative to each other comprise:
   a retaining element with a cutout, in which the motor is rotatable around the spindle axis at least over a predetermined angular range; and
   at least one detent element that is provided on the motor and that in a respectively corresponding recess in the retaining element is movable in the circumferential direction and is guided by way of a first part of the predetermined angular range in the sense of mutual locking relative to the axial direction,
   wherein the recess in the retaining element comprises a disengaging position that is formed by a notch, in which disengaging position the detent element is released in the axial direction.

4. The motorized spindle drive according to claim 3, characterized in that a detachable coupling is provided that comprises a detent element that is guided in a recess.

5. The motorized spindle drive according to claim 3, characterized in that a detachable coupling is provided that comprises two or more detent elements, each being guided in a recess, which detent elements are mutually offset by identical angles or different angles over the circumference.

6. The motorized spindle drive according to claim 2, characterized in that:
   the two elements which when the predetermined torque has been exceeded release the movement of the elements and that are moveable relative to each other from the first position to the second position comprise a friction clutch that is effective between the two elements that are moveable relative to each other.

7. The motorized spindle drive according to claim 2, characterized in that:
   the two elements which when the predetermined torque has been exceeded release the movement of the elements and that are moveable relative to each other from the first position to the second position comprise an elastic spring element that is effective between the two elements that are moveable relative to each other.

8. The motorized spindle drive according to claim 1, characterized in that the motor is an electric motor.

9. The motorized spindle drive according to claim 1, characterized in that the transmission element that engages the spindle is a spindle nut that is arranged centrically in a rotor of the motor.

10. The motorized spindle drive according to claim 9, characterized in that the motor is arranged so as to encompass the spindle concentrically to the axis thereof.

* * * * *